(12) United States Patent
Huber (10) Patent No.: US 8,289,821 B1
(45) Date of Patent: Oct. 16, 2012

(54) METHOD AND SYSTEM FOR PULSING EAMR DISK DRIVES

(75) Inventor: William D. Huber, Hollister, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 2 days.

(21) Appl. No.: 12/973,957

(22) Filed: Dec. 21, 2010

(51) Int. Cl.
*G11B 7/085* (2006.01)

(52) U.S. Cl. .................................... 369/30.03

(58) Field of Classification Search .................. None
See application file for complete search history.

(56) References Cited

U.S. PATENT DOCUMENTS

| | | | |
|---|---|---|---|
| 4,080,576 A | 3/1978 | Huber | |
| 4,122,501 A | 10/1978 | Sordello | |
| 6,801,240 B2 | 10/2004 | Abe | |
| 7,242,651 B2 * | 7/2007 | Asano et al. | 369/47.28 |
| 7,317,665 B2 | 1/2008 | Watanabe | |
| 7,538,978 B2 | 5/2009 | Sato | |
| 2001/0055355 A1 * | 12/2001 | Okamoto | 375/355 |
| 2002/0003847 A1 * | 1/2002 | Yamamoto et al. | 375/344 |
| 2002/0006007 A1 * | 1/2002 | Ataee | 360/73.01 |
| 2006/0132957 A1 * | 6/2006 | Hamaguchi et al. | 360/59 |
| 2007/0206649 A1 | 9/2007 | Xu | |
| 2008/0024896 A1 * | 1/2008 | Ohta et al. | 360/59 |
| 2008/0037382 A1 * | 2/2008 | Ueno | 369/44.13 |
| 2008/0107423 A1 * | 5/2008 | Lee et al. | 398/136 |
| 2009/0003835 A1 * | 1/2009 | Arahira | 398/155 |
| 2009/0296256 A1 | 12/2009 | Tsuyama | |
| 2010/0232053 A1 * | 9/2010 | Yano et al. | 360/75 |
| 2011/0116184 A1 * | 5/2011 | Yasui et al. | 360/59 |
| 2011/0228653 A1 * | 9/2011 | Shimazawa et al. | 369/13.32 |

OTHER PUBLICATIONS

W. Don Huber, et al, "Advanced Interconnect Design for High Data Rate Perpendicular Magnetic Recording", IEEE Trans. Mag., Jan. 2008, p. 175-180, vol. 44, No. 1.
W. A. Challener, et al, "The Road to HAMR", Magnetic Recording Conference, Jan. 2009, APMRC '09, Asia-Pacific, 14-16.
W. Don Huber and David A. Schmidt, "High Data Rate Magneto-Optical Recording", May 14, 2000-May 17, 2000, p. 126-128, Optical Data Storage 2000, Conference Digest.

* cited by examiner

*Primary Examiner* — Joseph Feild
*Assistant Examiner* — Henok Heyi (57) ABSTRACT

A method and system for providing an energy assisted magnetic recording (EAMR) disk drive are described. The disk drive includes a magnetic recording media, a pre-amplifier, an EAMR head, and at least one clock recovery circuit. The pre-amplifier provides a write current signal and a write gate signal for providing power to the EAMR head. The EAMR head includes at least one write transducer and at least one laser. The write transducer(s) are coupled with the pre-amplifier and include at least one writer coil. The write current signal from the pre-amplifier drives the writer coil(s). The clock recovery circuit(s) are coupled with the laser(s). The clock recovery circuit(s) receive the write current signal and the write gate signal and output laser control signal(s) that energize the laser(s) such that the laser(s) are energized synchronously with the writer coil(s).

20 Claims, 6 Drawing Sheets

METHOD AND SYSTEM FOR PULSING EAMR DISK DRIVES

BACKGROUND

Figure 1:
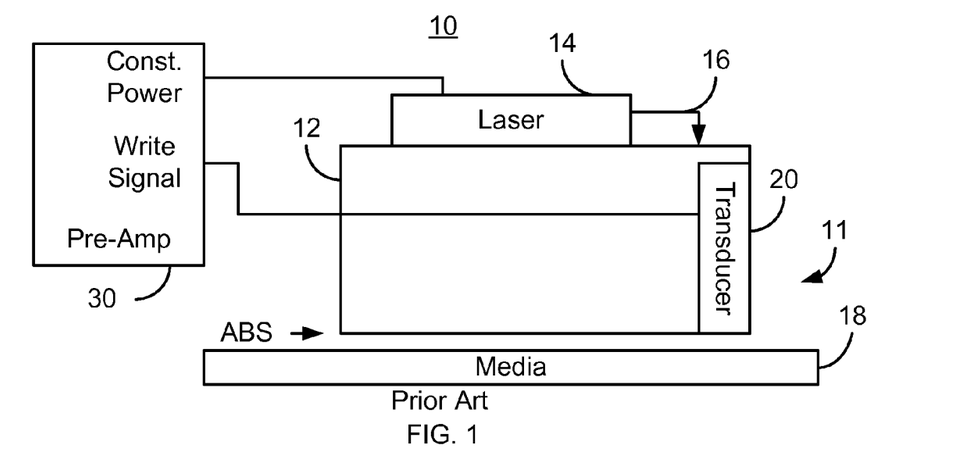
FIG. 1 is a diagram depicting a portion of a conventional energy assisted magnetic recording disk drive.

FIG. 1 depicts a side view of portion of a conventional energy assisted magnetic recording (EAMR) disk drive 10. For clarity, FIG. 1 is not to scale. For simplicity not all portions of the EAMR disk drive 10 are shown. The EAMR disk drive 10 includes an EAMR head 11 including a slider 12 and a transducer 20. THE EAMR disk drive 10 also includes a laser/light source 14, optics 16 for directing light from the laser 14, media 18, a transducer 20, and preamplifier and associated circuitry 30. The laser 14 is typically a laser diode. Although shown as mounted on the slider 11, the laser 14 may be coupled with the slider 11 in another fashion. For example, the laser 11 might be mounted on a suspension (not shown in FIG. 1) to which the slider 11 is also attached. The media 18 may include multiple layers, which are not shown in FIG. 1 for simplicity.

The EAMR head 11 includes an EAMR transducer 20. The EAMR head 11 may also include a read transducer (not shown in FIG. 1). The read transducer may be included if the EAMR head 11 is a merged head. The EAMR transducer 20 includes optical components (not shown in FIG. 1) as well as magnetic components (not shown in FIG. 1).

Figure 10:
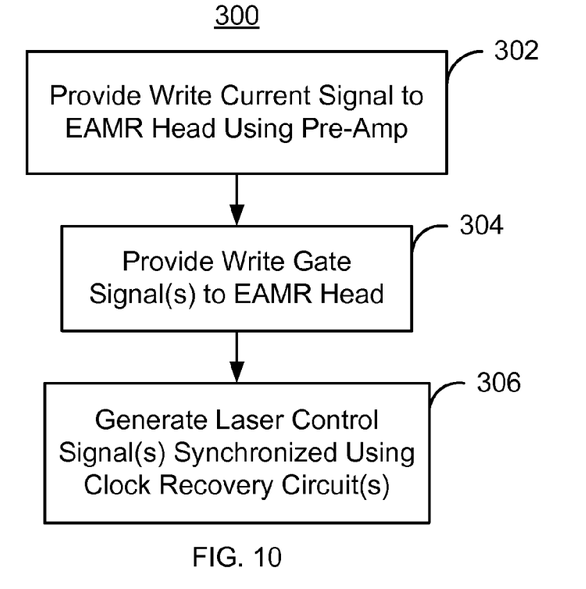
FIG. 10 is a flow chart depicting another exemplary embodiment of a method for using the EAMR head.

Also shown in conventional pre-amplifier 30. As shown in FIG. 10, the pre-amplifier 30 is typically located remote from the slider 12. For example, the pre-amplifier may reside on a flexible printed circuit board (actuator flex). The actuator flex provides mechanical and electrical connection between a system on a chip (SOC) including other electronics and the slider 12, which is typically mounted on the actuator flex. The conventional pre-amplifier 30 provides DC power for the conventional laser diode 14 and power for the transducer 20. For the transducer 20, the pre-amplifier 30 may be connected by two lines for a fly height sensor that helps determine the distance between the ABS and the media, one to two lines for a fly height control heater and ground, two lines for read data, and two lines for the write data.

In operation, the pre-amplifier 30 provides a constant power signal to the laser 14 during writing. Thus, the laser 14 remains on throughout the write operations. The laser 14 provides a constant source of energy, which is used to heat small regions of the media 18. The pre-amplifier 30 also provides write signals to the transducer 20. The write signals selectively energize one or more coils (not shown in FIG. 1). These coils energize a write pole (not shown in FIG. 1). The transducer 20 then magnetically writes to the media 18 in the heated region.

Although the conventional EAMR disk drive 10 functions, it is desirable to reduce power consumption of the EAMR disk drive 10. Electrical connectivity is still desired to be made to the EAMR transducer 20. Further, smaller components are desired to be used to support higher density magnetic recording.

Accordingly, what is needed are improved methods and systems for providing electrical connectivity and control in EAMR disk drives.

BRIEF SUMMARY OF THE INVENTION

A method and system for providing an energy assisted magnetic recording (EAMR) disk drive are described. The disk drive includes a magnetic recording media, a pre-amplifier, an EAMR head, and at least one clock recovery circuit. The pre-amplifier provides a write current signal and a write gate signal for providing power to the EAMR head. The EAMR head includes at least one write transducer and at least one laser. The write transducer(s) are coupled with the pre-amplifier and include at least one writer coil. The write current signal from the pre-amplifier drives the writer coil(s). The clock recovery circuit(s) are coupled with the laser(s). The clock recovery circuit(s) receive the write current signal and the write gate signal and output laser control signal(s) that energize the laser(s) such that the laser(s) are energized synchronously with the writer coil(s).

DETAILED DESCRIPTION OF EMBODIMENTS OF THE INVENTION

Figure 2:
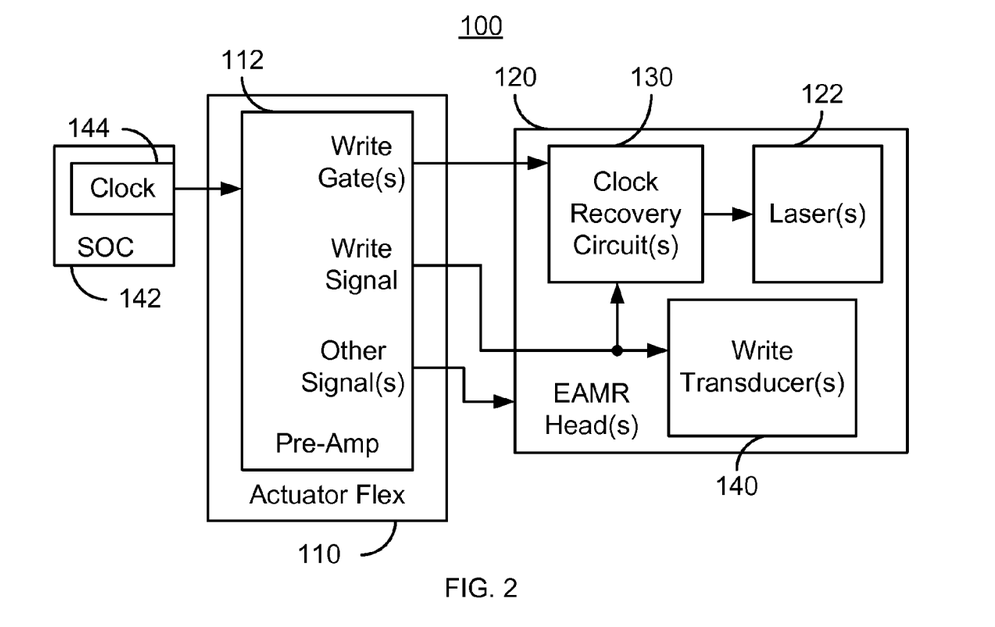
FIGS. 2-3 are diagrams depicting an exemplary embodiment of an EAMR disk drive.
Figure 3:
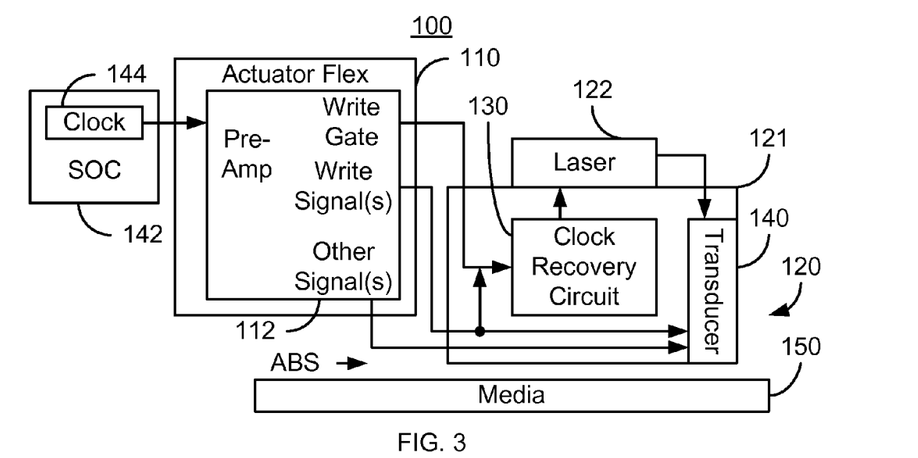

FIGS. 2-3 depict one embodiment of an EAMR disk drive 100. FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes an actuator flex 110 having a preamplifier 112, EAMR head(s) 120, an SOC 142 having a clock 144, and media 150. Although a single EAMR head 120 is shown, multiple EAMR heads may be used in a disk drive. In some embodiments, the laser 122 is a laser diode. Although shown as mounted on the slider 121, the laser 122 may be coupled with the slider 121 in another fashion. The media 150 may include multiple layers, which are not shown in FIG. 2 for simplicity.

The EAMR head(s) 120 includes a slider 121, a laser/light source 122, clock recovery circuit(s) 130, and an EAMR transducer 140. The EAMR head 120 may also include a read transducer (not shown in FIG. 2). The read transducer may be included if the EAMR head 120 is a merged head. The EAMR transducer 140 includes optical components (not shown in FIG. 2) as well as magnetic components (not shown in FIG. 2).

The pre-amplifier 112 resides on the actuator flex 110 and has as an input the clock signal from the clock 144. Although shown as residing in the SOC 142, the clock 144 may be at another location. The pre-amplifier 112 provides multiple signals to the EAMR head 120. In the embodiment shown, the pre-amplifier 112 provides a write signal. The write signal is provided to writer coil(s) (not shown in FIGS. 2-3) for energizing the pole (not shown) of the EAMR transducer 140 to write to the media 150. The write gate signal may also include power for the components on the EAMR head 120. The write signal is also provided to the clock recovery circuit(s) 130. The pre-amplifier 140 also provides a write gate signal to the clock recovery circuit(s) 130. The write gate signal from the preamplifier 112 may also drive associated electronics for the laser 122. The pre-amplifier 112 may also provide other signals to the EAMR head(s) 120. For example, signals may be provided to a fly height sensor and a heater for fly height control. In other embodiments, fewer, other and/or additional signals might be provided by the pre-amplifier to the EAMR head(s) 120.

The clock recovery circuit(s) 130 are used to drive the laser 122. Although only one clock recovery circuit 130 and laser 122 are shown, multiple may be included in the EAMR head(s) 120. In the embodiment shown, the clock recovery circuit(s) 130 reside in proximity to the laser 122. In some embodiments, the clock recovery circuit 130 may be part of the laser diode 122. In other embodiments, the clock recovery circuits(s) 130 may reside on another portion of the slider 121. The clock recovery circuit(s) 130 utilize the write signal(s) and the write gate signal from the pre-amplifier to drive the laser 122. In particular, the clock recovery circuit(s) 130 synchronizes the laser with the writing of the EAMR transducer 140. Consequently, the clock recovery circuit 130 outputs at least one laser control signal that energizes the laser 122 such that the laser is energized synchronously with the writer coil. Stated differently, the laser control signal drives the laser 122 such that the laser 122 is synchronized with the write coil(s) that energize the pole of the EAMR transducer 120.

Using the EAMR disk drive 100, the laser 122 can be driven synchronously with the write coils of the EAMR transducer 140. The clock recovery circuit(s) 130 account for, among other issues, differences in the delay of the clock signal from the clock 144 to the EAMR transducer 130 and the clock signal from the clock 144 to the laser 122. Thus, the laser 122 may be pulsed in time with the write signal instead of driven continuously. As a result, a higher peak energy may be used with lower average power, without overheating the laser 122. Consequently, performance of the EAMR disk drive 100 may be enhanced.

Figure 4:
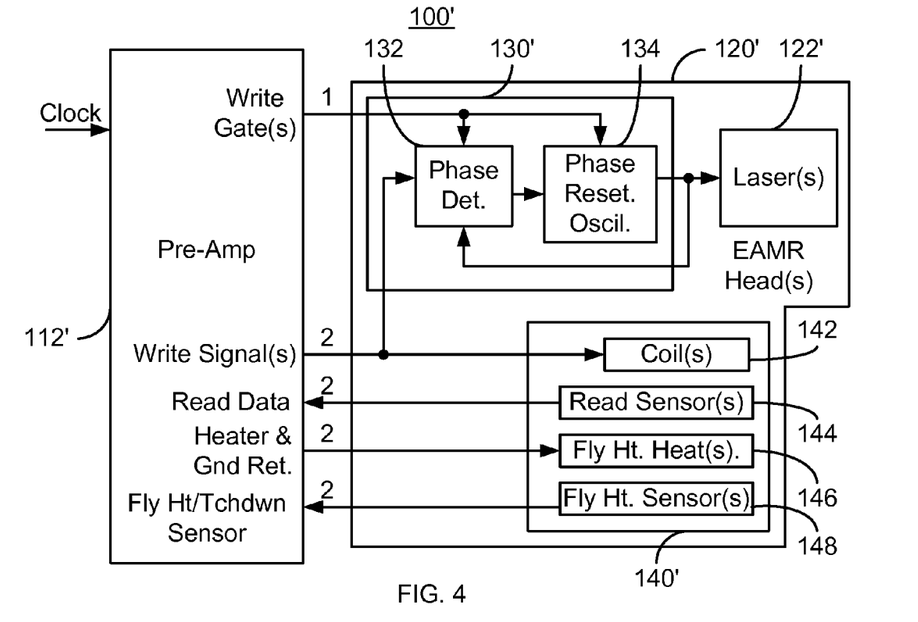
FIG. 4 is a depicting an exemplary embodiment of an EAMR disk drive.

FIG. 4 depicts In an EAMR disk drive 100'. The EAMR disk drive 100' is analogous to the EAMR disk drive 100. The EAMR disk drive 100' thus includes components having an analogous structure and function to components in the EAMR disk drive 100. The EAMR disk drive 100' thus includes a pre-amplifier 112', EAMR head(s) 120', laser(s) 122', clock recovery circuit(s) 130', and EAMR transducer 140' that are analogous to pre-amplifier 112, EAMR head(s) 120, laser(s) 122, clock recovery circuit(s) 130, and EAMR transducer 140, respectively. Selected portions of the EAMR transducer 140' are also shown. For example, coil(s) 142, read sensor(s) 144, fly height control heater(s) 146, and fly height sensor(s) 148 are shown. Additional components, such as poles, shields, and/or other structures are not shown for clarity. For simplicity, SOC 142, clock 144, and actuator flex 110 shown in FIG. 3 have been omitted in FIG. 4.

The clock recovery circuit(s) 130' include components 132 and 134. In particular, the clock recovery circuit(s) 130' include a phase detector 132 and phase resettable oscillator 134. The phase detector 132 and phase resettable oscillator 134 form a phase locked loop. The phase detector 132 includes inputs for the write gate signal, the laser control signal(s) generated by the clock recovery circuit 100', and the write gate signal(s). The phase detector 132 outputs a phase signal to the phase resettable oscillator 134. The phase resettable oscillator 134 receives an input from the write gate signal and the phase signal from the phase detector 132. The phase resettable oscillator 134 outputs the laser control signal to the laser 122'. The laser control signal is also fed back to the phase detector 132. Thus, a phase locked loop is formed in the clock recovery circuit 130'.

Also shown in the EAMR disk drive 100' are the proposed number of lines between the pre-amplifier 112' and the EAMR head(s) 120'. However, in another embodiment, another number of lines may be used. The write gate signal and any power provided may be carried on one line. In some embodiments, the write signal uses two lines to carry write data. The read data may also be carried on two lines. The heater signal and ground returns for the fly height control heater(s) 146 may be carried on one or two lines. The fly height/touchdown sensor data is provided from the fly height sensor 148 on two lines.

The phase lock loop formed by the phase detector 132 and phase resettable oscillator 134 synchronizes the laser 122' with the write signal to the coil(s) 142. Thus, the laser 122' may be pulsed in time with the coil(s) 142 instead of driven continuously. As a result, higher peak energy may be used, without overheating the laser 122'. Consequently, performance of the EAMR disk drive 100' may be enhanced.

Figure 5:
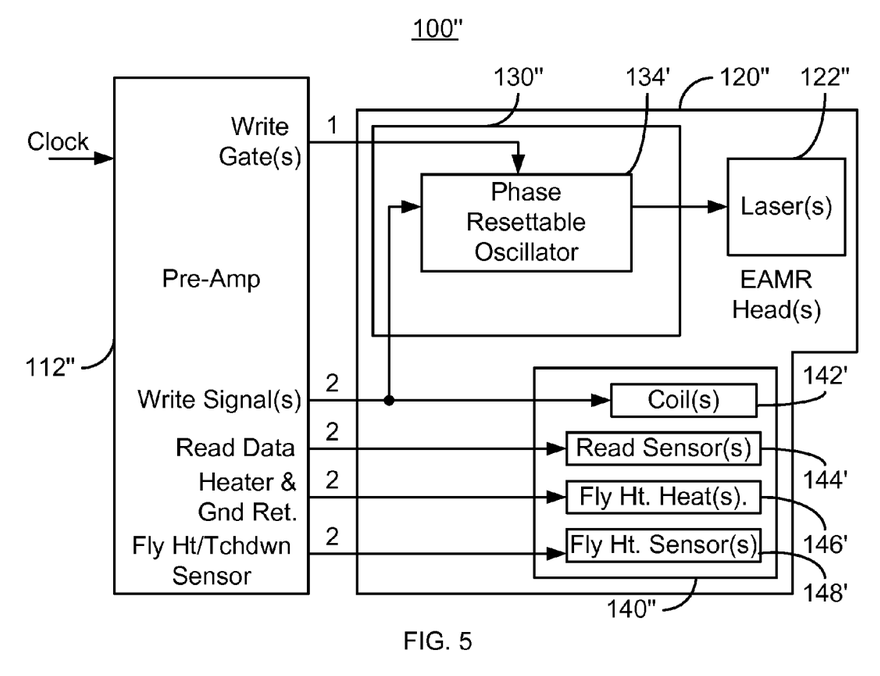
FIG. 5 is a depicting another exemplary embodiment of an EAMR disk drive.

FIG. 5 depicts In an EAMR disk drive 100". The EAMR disk drive 100" is analogous to the EAMR disk drives 100 and 100'. The EAMR disk drive 100" thus includes components having an analogous structure and function to components in the EAMR disk drive 100. The EAMR disk drive 100" thus includes a pre-amplifier 112", EAMR head(s) 120", laser(s) 122", clock recovery circuit(s) 130", and EAMR transducer 140" that are analogous to pre-amplifier 112, EAMR head(s) 120, laser(s) 122, clock recovery circuit(s) 130, and EAMR transducer 140, respectively. Selected portions of the EAMR transducer 140" are also shown. For example, coil(s) 142', read sensor(s) 144', fly height control heater(s) 146', and fly height sensor(s) 148' are shown. Additional components, such as poles, shields, and/or other structures are not shown for clarity. For simplicity, SOC 142, clock 144, and actuator flex 110 shown in FIG. 3 have been omitted in FIG. 5.

The clock recovery circuit(s) 130" include phase resettable oscillator 134'. Thus, the phase detector 132 shown in FIG. 4 has been omitted from the embodiment shown in FIG. 5. The phase resettable oscillator 134' may be used alone in embodiments in which some downstream timing errors are acceptable. In some embodiments, a buffer or other means for introducing a delay may be used in the clock recovery circuit 130" or elsewhere. The phase resettable oscillator 134' receives an input from the write gate signal and from the write signal. The phase resettable oscillator 134' outputs the laser control signal to the laser 122'.

Also shown in the EAMR disk drive 100" are the proposed number of lines between the pre-amplifier 112" and the EAMR head(s) 120". However, in another embodiment, another number of lines may be used. The write gate signal and any power provided may be carried on one line. In some embodiments, the write signal uses two lines to carry write data. The read data may also be carried on two lines. The heater signal and ground returns for the fly height control heater(s) 146' may be carried on two lines. The fly height/touchdown sensor data is provided from the fly height sensor 148' on two lines.

The phase resettable oscillator 134' synchronizes the laser 122' with the write signal to the coil(s) 142'. Thus, the laser 122" may be pulsed in time with the coil(s) 142' instead of driven continuously. As a result, higher peak energy may be used without overheating the laser 122". Consequently, performance of the EAMR disk drive 100" may be enhanced.

Figure 6:
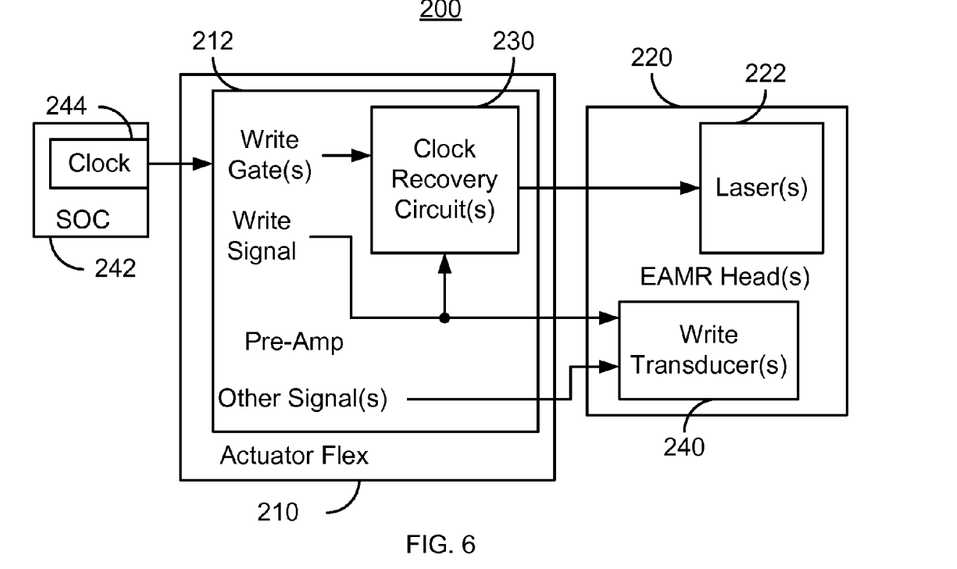
FIGS. 6-7 are diagrams depicting an exemplary embodiment of an EAMR disk drive.
Figure 7:
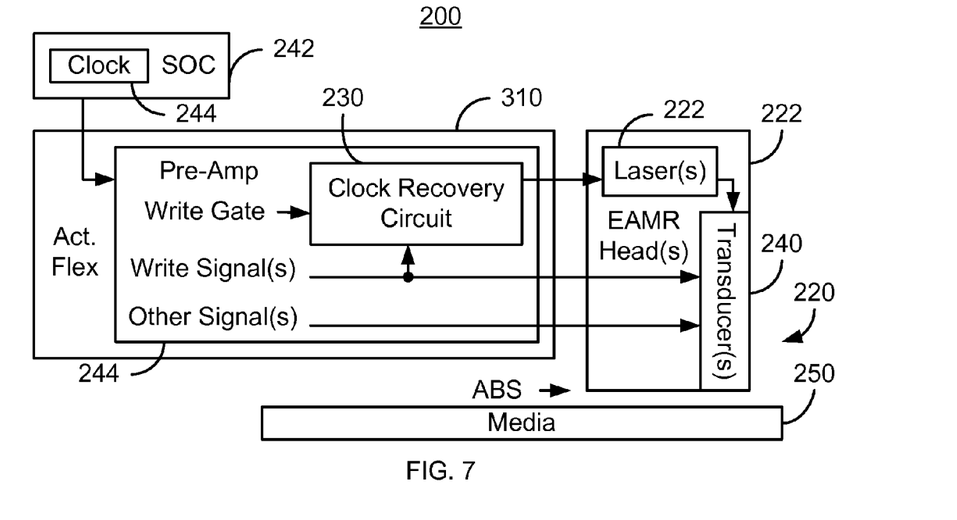

FIGS. 6-7 depict another embodiment of an EAMR disk drive 200. FIG. 6 is a diagram depicting a portion of an EAMR disk drive 200. For clarity, FIG. 7 is not to scale. For simplicity not all portions of the EAMR disk drive 200 are shown. In addition, although the disk drive 200 is depicted in the context of particular components other and/or different components may be used. Further, the arrangement of components may vary in different embodiments. The EAMR disk drive 200 includes an actuator flex 210 having a preamplifier 212, EAMR head(s) 220, an SOC 242 having a clock 244, and media 250. Although a single EAMR head 220 is shown, multiple EAMR heads may be used in a disk drive. In some embodiments, the laser 222 is a laser diode. Although shown as mounted on the slider 221, the laser 222 may be coupled with the slider 221 in another fashion. The media 250 may include multiple layers, which are not shown in FIG. 7 for simplicity.

The EAMR head(s) 220 includes a slider 221, a laser/light source 222, clock recovery circuit(s) 230, and an EAMR transducer 240. The EAMR head 220 may also include a read transducer (not shown in FIG. 6). The read transducer may be included if the EAMR head 220 is a merged head. The EAMR transducer 240 includes optical components (not shown in FIG. 6) as well as magnetic components (not shown in FIG. 6).

The pre-amplifier 212 resides on the actuator flex 210 and has as an input the clock signal from the clock 244. Although shown as residing in the SOC 242, the clock 244 may be at another location. The pre-amplifier 212 provides multiple signals to the EAMR head 220. In the embodiment shown, the pre-amplifier 212 provides a write signal. The write signal is provider to writer coil(s) (not shown in FIGS. 6-7) for energizing the pole (not shown) of the EAMR transducer 240 to write to the media 250. The write gate signal may also include power for the components on the EAMR head 220. The write signal is also provided to the clock recovery circuit(s) 230. The pre-amplifier 240 also provides a write gate signal to the clock recovery circuit(s) 230. The write gate signal from the preamplifier 212 may also drive associated electronics for the laser 222. The pre-amplifier 212 may also provide other signals to the EAMR head(s) 220. For example, signals may be provided to a fly height sensor and a heater for fly height control. In other embodiments, fewer, other and/or additional signals might be provided by the pre-amplifier to the EAMR head(s) 220.

The clock recovery circuit(s) 230 are used to drive the laser 222. Although only one clock recovery circuit 230 and laser 222 are shown, multiple may be included. However, in the embodiment shown, the clock recovery circuit(s) 230 reside in the pre-amplifier 212. Thus, a single clock recovery circuit 230 may drive multiple EAMR heads 220. Further, the clock recovery circuit(s) 230 may still be considered to reside in proximity to the laser 222 in that the cock recovery circuit 230 resides on one of the actuator flex 210 and the EAMR head(s) 220. The clock recovery circuit(s) 230 utilize the write signal(s) and the write gate signal from the pre-amplifier to drive the laser 222. In particular, the clock recovery circuit(s) 230 synchronizes the laser with the writing of the EAMR transducer 240. Consequently, the clock recovery circuit 230 outputs at least one laser control signal that energizes the laser 222 such that the laser is energized synchronously with the writer coil. Stated differently, the laser control signal drives the laser 222 such that the laser 222 is synchronized with the write coil(s) that energize the pole of the EAMR transducer 220.

The EAMR disk drive 200 is analogous to the EAMR disk drive 100. Consequently, similar benefits may be attained. For example, the laser 222 can be driven synchronously with the write coils of the EAMR transducer 240. Thus, the laser 222 may be pulsed in time with the instead of driven continuously. Higher peak energy may thus be used, without overheating the laser 222. Consequently, performance of the EAMR disk drive 200 may be enhanced. Further, the clock recovery circuit(s) 230 reside in the pre-amplifier 230, instead of on the EAMR head(s) 220. Thus, a single clock recovery circuit 230 may be used to drive multiple lasers 222 on multiple EAMR heads 220. Thus, the repetition of electronics used in driving the circuitry (such as the laser 222) on the EAMR head(s) may be reduced. However, in some embodiments, delays between the clock recovery circuitry 230 and the laser 222 are matched with delays between the pre-amplifier 212 and the EAMR transducer 240.

Figure 8:
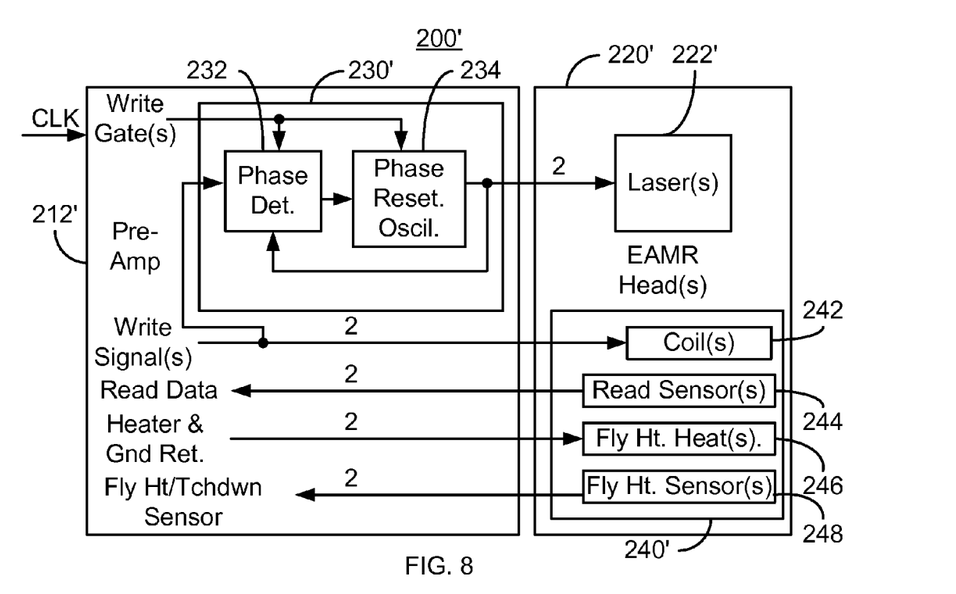
FIG. 8 is a depicting an exemplary embodiment of an EAMR disk drive.

FIG. 8 depicts In an EAMR disk drive 200'. The EAMR disk drive 200' is analogous to the EAMR disk drive 200. The EAMR disk drive 200' thus includes components having an analogous structure and function to components in the EAMR disk drive 200. The EAMR disk drive 200' thus includes a pre-amplifier 212', EAMR head(s) 220', laser(s) 222', clock recovery circuit(s) 230', and EAMR transducer 240' that are analogous to pre-amplifier 212, EAMR head(s) 220, laser(s) 222, clock recovery circuit(s) 230, and EAMR transducer 240, respectively. Selected portions of the EAMR transducer 240' are also shown. For example, coil(s) 242, read sensor(s) 244, fly height control heater(s) 246, and fly height sensor(s) 248 are shown. Additional components, such as poles, shields, and/or other structures are not shown for clarity. For simplicity, SOC 242, clock 244, and actuator flex 210 shown in FIGS. 6-7 have been omitted in FIG. 8.

The clock recovery circuit(s) 230' include components 232 and 234. In particular, the clock recovery circuit(s) 230' include a phase detector 232 and phase resettable oscillator 234. The phase detector 232 and phase resettable oscillator 234 form a phase locked loop. The phase detector 232 includes inputs for the write gate signal, the laser control signal(s) generated by the clock recovery circuit 200', and the write gate signal(s). The phase detector 232 outputs a phase signal to the phase resettable oscillator 234. The phase resettable oscillator 234 receives an input from the write gate signal and the phase signal from the phase detector 232. The phase resettable oscillator 234 outputs the laser control signal to the laser 222'. The laser control signal is also fed back to the phase detector 232. Thus, a phase locked loop is formed in the clock recovery circuit 230'. In some embodiments, a buffer or other means for introducing a delay may be used in the clock recovery circuit 230' or elsewhere to match between the clock recovery circuit 230' and the laser 222' and the preamplifier 212' and the writer coil(s) 242.

Also shown in the EAMR disk drive 200' are the proposed number of lines between the pre-amplifier 212' and the EAMR head(s) 220'. However, in another embodiment, another number of lines may be used. The laser control signal may be carried on two lines from the pre-amplifier 212' to the laser 222'. These lines may be a differential pair carrying pulses to the laser 222' at twice the data rate of the write signal. In some embodiments, the write signal uses two lines to carry write data. The read data may also be carried on two lines. The heater signal and ground returns for the fly height control heater(s) 146 may be carried on one or two lines. The fly height/touchdown sensor data is provided from the fly height sensor 148 on two lines.

The phase lock loop formed by the phase detector 232 and phase resettable oscillator 234 synchronizes the laser 222' with the write signal to the coil(s) 242. Thus, the laser 222' may be pulsed in time with the coil(s) 242 instead of driven continuously. As a result, higher peak energy may be used, without overheating the laser 222'. Consequently, performance of the EAMR disk drive 200' may be enhanced. Further, as discussed above with respect to the EAMR disk drive 200, a single clock recovery circuit 200' may drive multiple EAMR heads 220'. Thus, less circuitry may be used per head 220'. However, in some embodiments, delays between the clock recovery circuitry 230' and the laser 222' are matched with delays between the pre-amplifier 212' and the write coil(s) 242.

Figure 9:
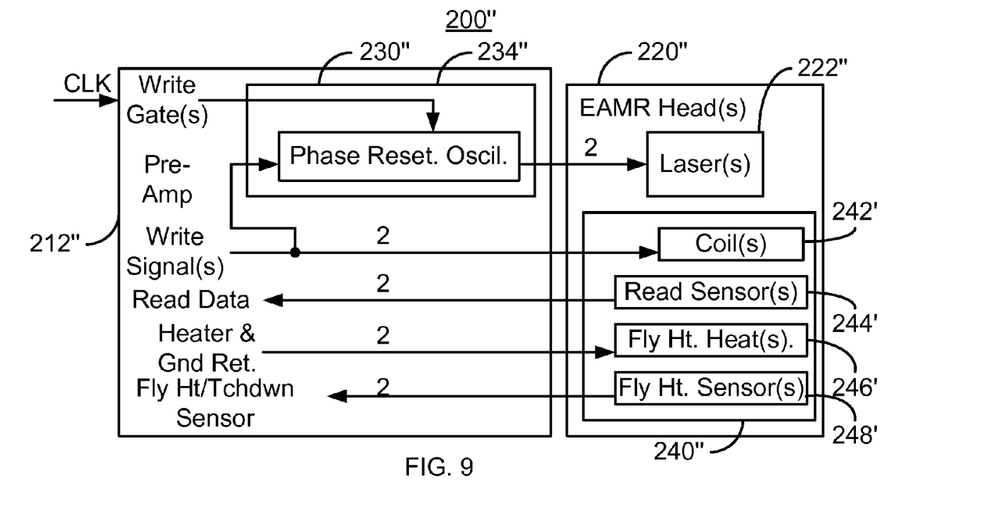
FIG. 9 is a depicting another exemplary embodiment of an EAMR disk drive.

FIG. 9 depicts In an EAMR disk drive 200". The EAMR disk drive 200" is analogous to the EAMR disk drives 200 and 200'. The EAMR disk drive 200" thus includes components having an analogous structure and function to components in the EAMR disk drive 200. The EAMR disk drive 200" thus includes a pre-amplifier 212", EAMR head(s) 220", laser(s) 222", clock recovery circuit(s) 230", and EAMR transducer 240" that are analogous to pre-amplifier 212, EAMR head(s) 220, laser(s) 222, clock recovery circuit(s) 230, and EAMR transducer 240, respectively. Selected portions of the EAMR transducer 240" are also shown. For example, coil(s) 242', read sensor(s) 244', fly height control heater(s) 246', and fly height sensor(s) 248' are shown. Additional components, such as poles, shields, and/or other structures are not shown for clarity. For simplicity, SOC 242, clock 244, and actuator flex 210 shown in FIGS. 6-7 have been omitted in FIG. 9.

The clock recovery circuit(s) 230" include phase resettable oscillator 234'. Thus, the phase detector 232 shown in FIG. 8 has been omitted from the embodiment shown in FIG. 9. The phase resettable oscillator 234' may be used alone in embodiments in which some downstream timing errors are acceptable. The phase resettable oscillator 234' receives an input from the write gate signal and from the write signal. The phase resettable oscillator 234' outputs the laser control signal to the laser 222'. In some embodiments, a buffer or other means for introducing a delay may be used in the clock recovery circuit 230" or elsewhere to match between the clock recovery circuit 230" and the laser 222" and the pre-amplifier 212" and the writer coil(s) 242'.

Also shown in the EAMR disk drive 200" are the proposed number of lines between the pre-amplifier 212" and the EAMR head(s) 220". However, in another embodiment, another number of lines may be used. The write gate signal and any power provided may be carried on one line. In some embodiments, the write signal uses two lines to carry write data. The read data may also be carried on two lines. The heater signal and ground returns for the fly height control heater(s) 246' may be carried on two lines. The fly height/ touchdown sensor data is provided from the fly height sensor 248' on two lines.

The phase resettable oscillator 234' synchronizes the laser 222' with the write signal to the coil(s) 242'. Thus, the laser 222" may be pulsed in time with the coil(s) 242' instead of driven continuously. As a result, higher peak energy may be used without overheating the laser 222". Consequently, performance of the EAMR disk drive 200" may be enhanced. However, in some embodiments, delays between the clock recovery circuitry 230" and the laser 222" are matched with delays between the pre-amplifier 212" and the write coil(s) 242'.

FIG. 10 is a flow chart depicting an exemplary embodiment of a method 300 for writing to a media in an EAMR disk drive. Although certain steps are shown, some steps may be omitted, interleaved, performed in another order, and/or combined. The method 300 is described in connection with the EAMR disk drives 100 and 200. However, the method may be used with other disk drives including but not limited to the disk drives 100', 100", 200', and 200".

Figure 11:
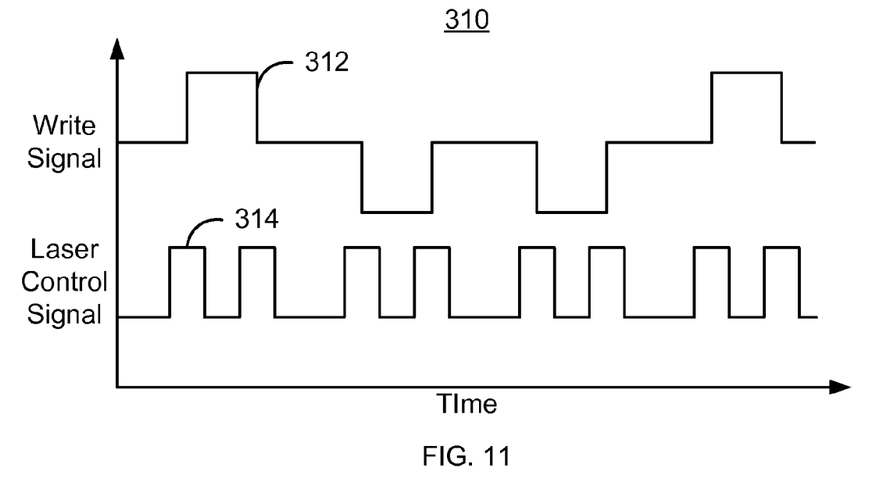
FIG. 11 is a graph depicting an exemplary embodiment of data signals for the EAMR transducer and laser.

A write current signal is provided to the EAMR head 120/220 using a pre-amplifier 112'212, via step 302. The write signal has a data rate and is used for energizing the writer coil(s) such as the coils 142, 142', 242, and/or 242'. FIG. 11 is a graph 310 depicting write signal 312 used to drive the EAMR transducer 140/240 and a laser control signal 314 used in driving the laser(s) 122/222. The signals 312 and 314 shown are for explanatory purposes only and are not intended to represent a particular data set or embodiment. Referring to FIGS. 10 and 11, the write data 312 may be bi-directional so that the coil(s) 142/142'/242/242' may energize the pole in the desired direction.

A write gate signal is provided to the EAMR head 120/220 using the pre-amplifier 112/212, via step 304. The write gate signal is used to drive the laser(s) 122/222 and to provide power to the EAMR head 120/220.

Laser control signal(s) are generated using clock recovery circuit(s) 130/230 coupled with the laser 122/222, via step 306. One embodiment of the laser control signal 314 is shown in FIG. 11. Because of the clock recovery circuit 130/230, the laser control signal 314 is synchronized with the write current signal 312. Stated differently, the laser control signal 314 energizes the laser 122/222 such that the laser 122/22 is energized synchronously with the writer coil(s) 142/142'/ 242/242'. As can be seen in the embodiment shown in FIG. 11, the laser 122/222 is energized during the transitions of the write signal 312. Thus, the data rate of the laser control signal 314 is approximately twice that of the write signal 312. Further, the laser control signal 314 straddles the transitions of the write signal 312. The laser control signal may be generated by a phase locked loop in the clock recovery circuit 130'/230' or by a phase resettable oscillator 134'/234.

Using the method 300, the laser 122/222 may be driven synchronously with the coil(s) 142/142'/242/242'. As a result, higher peak energy may while maintaining or reducing heat generated. Consequently, performance of the EAMR disk drive 100/200 may be enhanced.

I claim:

1. An energy assisted magnetic recording (EAMR) disk drive comprising:
   a magnetic recording media;
   a pre-amplifier for providing a write current signal and a write gate signal for providing power;
   an EAMR head, the EAMR head including at least one write transducer and at least one laser, the at least one write transducer coupled with the pre-amplifier and including at least one writer coil, the write current signal driving the at least one writer coil;
   at least one clock recovery circuit coupled with the at least one laser, the at least one clock recovery circuit receiving the write current signal and the write gate signal and outputting at least one laser control signal that energizes the at least one laser such that the at least one laser is energized synchronously with the at least one writer coil.

2. The EAMR disk drive of claim 1 wherein each of the at least one clock recovery circuit further includes:
   a phase detector including a plurality of inputs for receiving the write gate signal, the write current signal, and the least one laser control signal and an output for providing a phase; and
   a phase resettable oscillator coupled with the phase detector, receiving the phase and the write gate signal as inputs and outputting the at least one laser control signal.

3. The EAMR disk drive of claim 1 wherein the at least one laser control signal has a first data rate and the write current signal has a second data rate substantially half of the first data rate.

4. An energy assisted magnetic recording (EAMR) disk drive comprising:
   a magnetic recording media;
   a pre-amplifier for providing a write current signal and a write gate signal for providing power;
   an EAMR head, the EAMR head including at least one write transducer and at least one laser, the at least one write transducer coupled with the pre-amplifier and including at least one writer coil, the write current signal driving the at least one writer coil;
   at least one clock recovery circuit coupled with the at least one laser, the at least one clock recovery circuit receiving the write current signal and the write gate signal and outputting at least one laser control signal that energizes the at least one laser such that the at least one laser is energized synchronously with the at least one writer coil, the at least one laser control signal having a first data rate and the write current signal having a second data rate substantially half of the first data rate;
   wherein the write current signal has a plurality of transitions and wherein the at least one laser control signal energizes the laser for each of the plurality of transitions.

5. An energy assisted magnetic recording (EAMR) disk drive comprising:
   a magnetic recording media;
   a pre-amplifier for providing a write current signal and a write gate signal for providing power;
   an EAMR head, the EAMR head including at least one write transducer and at least one laser, the at least one write transducer coupled with the pre-amplifier and including at least one writer coil, the write current signal driving the at least one writer coil;
   at least one clock recovery circuit coupled with the at least one laser, the at least one clock recovery circuit receiving the write current signal and the write gate signal and outputting at least one laser control signal that energizes the at least one laser such that the at least one laser is energized synchronously with the at least one writer coil; and
   wherein the at least one clock recovery circuitry resides on the EAMR head.

6. An energy assisted magnetic recording (EAMR) disk drive comprising:
   a magnetic recording media;
   a pre-amplifier for providing a write current signal and a write gate signal for providing power;
   an EAMR head, the EAMR head including at least one write transducer and at least one laser, the at least one write transducer coupled with the pre-amplifier and including at least one writer coil, the write current signal driving the at least one writer coil;
   at least one clock recovery circuit coupled with the at least one laser, the at least one clock recovery circuit receiving the write current signal and the write gate signal and outputting at least one laser control signal that energizes the at least one laser such that the at least one laser is energized synchronously with the at least one writer coil; and
   wherein the at least one laser is a laser diode and wherein at least one clock recovery circuitry resides in proximity to the laser diode.

7. An energy assisted magnetic recording (EAMR) disk drive comprising:
   a magnetic recording media;
   a pre-amplifier for providing a write current signal and a write gate signal for providing power;
   an EAMR head, the EAMR head including at least one write transducer and at least one laser, the at least one write transducer coupled with the pre-amplifier and including at least one writer coil, the write current signal driving the at least one writer coil;
   at least one clock recovery circuit coupled with the at least one laser, the at least one clock recovery circuit receiving the write current signal and the write gate signal and outputting at least one laser control signal that energizes the at least one laser such that the at least one laser is energized synchronously with the at least one writer coil; and
   wherein the at least one clock recovery circuitry resides in the preamplifier.

8. The EAMR disk drive of claim 1 wherein the at least one clock recovery circuit further includes:
   a phase resettable oscillator.

9. The EAMR disk drive of claim 1 wherein the EAMR head further includes:
   a read transducer.

10. The EAMR disk drive of claim 1 wherein the EAMR head further includes:
    a fly height sensor; and
    a fly height control heater.

11. A method for writing data to a recording media in an energy assisted magnetic recording (EAMR) disk drive, the EAMR disk drive including at least one laser and at least one EAMR head coupled with the at least one laser, each of the at least one EAMR head including a write transducer including at least one writer coil and at least one write pole, the method comprising:
    providing a write current signal to the EAMR head using a pre-amplifier, the write signal for energizing the at least one writer coil;
    providing a write gate signal to the EAMR head using the pre-amplifier, the write gate signal providing power to the EAMR head;
    generating at least one laser control signal using at least one clock recovery circuit coupled with the at least one laser, the at least one laser control signal being synchronized with the write current signal, the at least one laser control signal for energizing the at least one laser such that the at least one laser is energized synchronously with the at least one writer coil.

12. The method of claim 11 wherein the clock recovery circuit further includes:
    a phase detector including a plurality of inputs for receiving the write gate signal, the write current signal, and the at least one laser control signal and an output for providing a phase; and
    a phase resettable oscillator coupled with the phase detector, receiving the phase and the write gate signal as inputs and outputting the at least one laser control signal.

13. The method of claim 11 wherein the at least one laser control signal has a first data rate and the write current signal has a second data rate substantially half of the first data rate.

14. A method for writing data to a recording media in an energy assisted magnetic recording (EAMR) disk drive, the EAMR disk drive including at least one laser and at least one EAMR head coupled with the at least one laser, each of the at least one EAMR head including a write transducer including at least one writer coil and at least one write pole, the method comprising:

providing a write current signal to the EAMR head using a pre-amplifier, the write signal for energizing the at least one writer coil;

providing a write gate signal to the EAMR head using the pre-amplifier, the write gate signal providing power to the EAMR head;

generating at least one laser control signal using at least one clock recovery circuit coupled with the laser, the at least one laser control signal being synchronized with the write current signal, the at least one laser control signal for energizing the at least one laser such that the at least one laser is energized synchronously with the at least one writer coil, the at least one laser control signal having a first data rate and the write current signal having a second data rate substantially half of the first data rate;

wherein the write current signal has a plurality of transitions and wherein the at least one laser control signal energizes the at least one laser for each of the plurality of transitions.

15. A method for writing data to a recording media in an energy assisted magnetic recording (EAMR) disk drive, the EAMR disk drive including at least one laser and at least one EAMR head coupled with the at least one laser, each of the at least one EAMR head including a write transducer including at least one writer coil and at least one write pole, the method comprising:

providing a write current signal to the EAMR head using a pre-amplifier, the write signal for energizing the at least one writer coil;

providing a write gate signal to the EAMR head using the pre-amplifier, the write gate signal providing power to the EAMR head;

generating at least one laser control signal using at least one clock recovery circuit coupled with the laser, the at least one laser control signal being synchronized with the write current signal, the at least one laser control signal for energizing the at least one laser such that the at least one laser is energized synchronously with the at least one writer coil;

wherein the at least one clock recovery circuitry resides on the EAMR head.

16. A method for writing data to a recording media in an energy assisted magnetic recording (EAMR) disk drive, the EAMR disk drive including at least one laser and at least one EAMR head coupled with the at least one laser, each of the at least one EAMR head including a write transducer including at least one writer coil and at least one write pole, the method comprising:

providing a write current signal to the EAMR head using a pre-amplifier, the write signal for energizing the at least one writer coil;

providing a write gate signal to the EAMR head using the pre-amplifier, the write gate signal providing power to the EAMR head;

generating at least one laser control signal using at least one clock recovery circuit coupled with the laser, the at least one laser control signal being synchronized with the write current signal, the at least one laser control signal for energizing the at least one laser such that the at least one laser is energized synchronously with the at least one writer coil;

wherein the at least one laser is a laser diode and wherein at least one clock recovery circuitry resides in proximity to the laser diode.

17. A method for writing data to a recording media in an energy assisted magnetic recording (EAMR) disk drive, the EAMR disk drive including at least one laser and at least one EAMR head coupled with the at least one laser, each of the at least one EAMR head including a write transducer including at least one writer coil and at least one write pole, the method comprising:

providing a write current signal to the EAMR head using a pre-amplifier, the write signal for energizing the at least one writer coil;

providing a write gate signal to the EAMR head using the pre-amplifier, the write gate signal providing power to the EAMR head;

generating at least one laser control signal using at least one clock recovery circuit coupled with the laser, the at least one laser control signal being synchronized with the write current signal, the at least one laser control signal for energizing the at least one laser such that the at least one laser is energized synchronously with the at least one writer coil;

wherein the at least one clock recovery circuitry resides in the preamplifier.

18. The method of claim 11 wherein the at least one clock recovery circuit further includes:

a phase resettable oscillator.

19. The method of claim 11 wherein the EAMR head further includes:

a read transducer.

20. The method of claim 11 wherein the EAMR head further includes:

a fly height sensor; and a fly height control heater.

* * * * *